US007817972B2

(12) United States Patent
Wan et al.

(10) Patent No.: US 7,817,972 B2
(45) Date of Patent: Oct. 19, 2010

(54) METHOD AND ARRANGEMENT FOR MUTUAL INFORMATION BASED POWER CONTROL

(75) Inventors: Lei Wan, Beijing (CN); Magnus Almgren, Sollentuna (SE); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 624 days.

(21) Appl. No.: 11/666,173

(22) PCT Filed: Oct. 29, 2004

(86) PCT No.: PCT/SE2004/001574

§ 371 (c)(1),
(2), (4) Date: Apr. 25, 2007

(87) PCT Pub. No.: WO2006/046893

PCT Pub. Date: May 4, 2006

(65) Prior Publication Data

US 2008/0132184 A1 Jun. 5, 2008

(51) Int. Cl.
*H04B 17/00* (2006.01)
(52) U.S. Cl. .................. 455/115.1; 340/653
(58) Field of Classification Search ............... 455/115.1
See application file for complete search history.

(56) References Cited

U.S. PATENT DOCUMENTS 5,068,723 A * 11/1991 Dixit et al. ............... 348/420.1
6,163,571 A * 12/2000 Asokan et al. ............... 375/225
6,411,799 B1 * 6/2002 Padovani ..................... 455/69
6,603,773 B2 * 8/2003 Laakso et al. ............... 370/441
6,633,552 B1 * 10/2003 Ling et al. .................. 370/318
6,993,063 B2 * 1/2006 Zeira et al. .................. 375/130
6,999,432 B2 * 2/2006 Zhang et al. ................ 370/328
7,000,395 B2 * 2/2006 Wai et al. ..................... 60/698
7,035,284 B2 * 4/2006 Willenegger et al. ........ 370/470
7,088,957 B2 * 8/2006 Ling et al. ............... 455/67.11
7,136,666 B2 * 11/2006 Charriere et al. ............ 455/522
7,197,021 B2 * 3/2007 Seo et al. .................... 370/335
7,197,327 B2 * 3/2007 Koo et al. ................... 455/522
7,209,515 B2 * 4/2007 Kilfoyle et al. ............. 375/152

(Continued)

FOREIGN PATENT DOCUMENTS

WO    03/055098        7/2003
WO    03/055098 A1     7/2003

OTHER PUBLICATIONS

International Search Report of PCT/SE2004/001574, mailed May 31, 2005.

(Continued)

*Primary Examiner*—Duc Nguyen
*Assistant Examiner*—Hai V Nguyen
(74) *Attorney, Agent, or Firm*—Nixon & Vanderhye, P.C.

(57) ABSTRACT

In a method for power control in a telecommunication system, the transmit power is adjusted based on at least the mutual information expression or a representation thereof. According to one aspect the transmit power for a coming slot is controlled based on the previously received slots, wherein an estimated quality is compared to a determined quality target based on the mutual information expression.

28 Claims, 8 Drawing Sheets

U.S. PATENT DOCUMENTS

| | | | |
|---|---|---|---|
| 7,218,949 B2 * | 5/2007 | Koo et al. | 455/522 |
| 7,221,664 B2 * | 5/2007 | Proctor, Jr. | 370/335 |
| 7,231,183 B2 * | 6/2007 | Pauli et al. | 455/67.11 |
| 7,245,935 B2 * | 7/2007 | Lin | 455/522 |
| 7,292,552 B2 * | 11/2007 | Willenegger et al. | 370/333 |
| 7,339,994 B2 * | 3/2008 | Lin et al. | 375/240.27 |
| 7,340,268 B2 * | 3/2008 | Oh et al. | 455/522 |
| 7,406,065 B2 * | 7/2008 | Willenegger et al. | 370/335 |
| 7,443,827 B2 * | 10/2008 | Sano | 370/342 |
| 7,484,111 B2 * | 1/2009 | Fung | 713/320 |
| 7,536,154 B2 * | 5/2009 | Rudolf et al. | 455/69 |
| 7,555,307 B2 * | 6/2009 | Koo et al. | 455/522 |
| 7,564,826 B2 * | 7/2009 | Sherman et al. | 370/338 |
| 7,630,344 B1 * | 12/2009 | Kilfoyle et al. | 370/334 |
| 7,660,600 B2 * | 2/2010 | Koo et al. | 455/522 |
| 2002/0054578 A1 * | 5/2002 | Zhang et al. | 370/328 |
| 2002/0058524 A1 | 5/2002 | Arimitsu | |
| 2002/0187802 A1 | 12/2002 | Agin et al. | |
| 2003/0039217 A1 * | 2/2003 | Seo et al. | 370/318 |
| 2003/0048800 A1 * | 3/2003 | Kilfoyle et al. | 370/441 |
| 2003/0086399 A1 * | 5/2003 | Proctor, Jr. | 370/335 |
| 2003/0099209 A1 * | 5/2003 | Laakso et al. | 370/311 |
| 2003/0174675 A1 * | 9/2003 | Willenegger et al. | 370/335 |
| 2003/0174676 A1 * | 9/2003 | Willenegger et al. | 370/335 |
| 2003/0174686 A1 * | 9/2003 | Willenegger et al. | 370/342 |
| 2004/0062225 A1 * | 4/2004 | Ling et al. | 370/338 |
| 2004/0076172 A1 * | 4/2004 | Sano | 370/442 |
| 2004/0106425 A1 * | 6/2004 | Koo et al. | 455/522 |
| 2004/0141483 A1 * | 7/2004 | Zeira et al. | 370/335 |
| 2004/0202242 A1 * | 10/2004 | Lin et al. | 375/227 |
| 2004/0203462 A1 * | 10/2004 | Lin et al. | 455/67.13 |
| 2005/0083999 A1 * | 4/2005 | Koo et al. | 375/148 |
| 2005/0215276 A1 * | 9/2005 | Koo et al. | 455/522 |
| 2006/0040696 A1 * | 2/2006 | Lin | 455/522 |
| 2006/0251180 A1 * | 11/2006 | Baum et al. | 375/260 |
| 2006/0252451 A1 * | 11/2006 | Cho et al. | 455/522 |
| 2006/0262840 A1 * | 11/2006 | Wang et al. | 375/221 |
| 2006/0270358 A1 * | 11/2006 | Ling et al. | 455/67.11 |
| 2007/0030847 A1 * | 2/2007 | Frei et al. | 370/389 |
| 2007/0077952 A1 * | 4/2007 | Sartori et al. | 455/515 |
| 2007/0086424 A1 * | 4/2007 | Calcev et al. | 370/350 |
| 2007/0173281 A1 * | 7/2007 | Koo et al. | 455/522 |
| 2007/0218937 A1 * | 9/2007 | Koo et al. | 455/522 |
| 2007/0223426 A1 * | 9/2007 | Proctor, Jr. | 370/335 |
| 2007/0298822 A1 * | 12/2007 | Wan et al. | 455/509 |
| 2008/0025261 A1 * | 1/2008 | Willenegger et al. | 370/333 |
| 2008/0108315 A1 * | 5/2008 | Hamalainen | 455/127.1 |
| 2008/0207251 A1 * | 8/2008 | Anderson | 455/522 |
| 2009/0221329 A1 * | 9/2009 | Rudolf et al. | 455/561 |
| 2009/0264146 A1 * | 10/2009 | Koo et al. | 455/522 |
| 2010/0041340 A1 * | 2/2010 | Kim | 455/67.13 |

OTHER PUBLICATIONS

Muckenheim, et al., "On Link Quality Estimation for 3G Wireless Communication Networks"—VTC 2000, IEEE.

Tsai et al, "Effective-SNR Mapping for Modeling Frame Error Rates in Multiple-State Channels", $3^{rd}$ Generation Partnership Project 2, 3GPP2-C30-20030429-010, Apr. 30, 2003.

English translation of CN Office Action mailed Apr. 8, 2010 in corresponding Chinese Application 200480044773.4.

* cited by examiner

METHOD AND ARRANGEMENT FOR MUTUAL INFORMATION BASED POWER CONTROL

This application is the US national phase of international application PCT/SE2004/001574, filed 29 Oct. 2004, which designated the U.S., the entire content of which is hereby incorporated by reference.

TECHNICAL FIELD

The present invention relates to telecommunication systems in general, specifically a method and an arrangement for improved transmit power control in such systems.

BACKGROUND

In present communication systems with multiple mobile users utilizing each base station, power control is needed in order to keep interference levels at minimum in the air interface while at the same time providing a required quality of service.

The so called Transmit Power Control (PC or TPC) functionality is crucial for interference limited cellular systems, such as WCDMA, GSM systems and 3G, where more high-powered mobiles interfere with weaker mobiles within one cell. If there were no mechanism for mobile stations to be power controlled to the same power level at a base station, a higher powered mobile station could easily overshout a weaker mobile. Power control adjusts the transmit power between a transmitter e.g. base station and a receiver e.g. mobile unit in order to maintain a certain quality while using no more transmit power than is absolutely necessary. This reduces the interference caused by the transmitter to other receivers. Also, the battery power for the mobiles is conserved.

In systems utilizing Code Division Multiple Access (CDMA), known power control functionalities that operate on the so called Signal to Interference Ratio (SIR) include Outer Loop Power Control (OLPC) and INner loop Power Control (INPC). OLPC is responsible for compensating for channel or link variations by adjusting the SIR target for the INPC based on the block error indicator (BEI) checked by a Cyclic Redundancy Check (CRC), which is sensitive to the accuracy of instantaneous quality measurements.

The INPC subsequently compares the estimated SIR at the receiver with the SIR target and adjusts the transmitted power accordingly. If the estimated SIR is higher than the SIR target a Transmit Power Control (TPC) command to lower the transmit power is signaled to the transmitter and vice versa if the estimated SIR exceeds the SIR target. However, for a coding block that experiences a multi-state channel, that the geometric average of SIR reaches the SIR target is equivalent to the decoding quality reaches the BLER target only when the neighboring Transmission Time Intervals (TTIs) have quite similar SIR statistic distributions. Therefore, known INPC is not optimal when neighboring TTIs have different SIR statistic distributions. This problem is more serious when channel various significantly during one.

In addition, in the cases of link-adaptation, the modulation and coding scheme (MCS) varies from one TTI to another. As a result, the SIR target based on the measurements of previously received will not always lead to the BLER target requirement for the current TTI. The same problem exists in AMR in a GSM system.

There are some known methods aiming at adjusting the INPC target based on a quicker quality measurement. In [1, 2, 3], two outer-loops have been used to keep the fast quality measurement reliable, with the slowest loop correct the quicker quality measurement based on a long-term quality measurement to keep the system stable. In [4] the attempts is made to shorten the FER measurement time and increase the measurement accuracy for the outer-loop power control by making use of the measurements of the other stronger channel or the other continuous transmitted channel, called associated channel.

SUMMARY

The technology described herein enables an improved power control in a telecommunication system.

The technology described herein enables determining an improved quality target.

The technology described herein enables power control that gives an improved convergence rate for highly time-varying channels.

The technology described herein enables power control that gives an improved convergence rate for services that are very sensitive to signal to interference ratio variations.

The technology described herein enables improved inner loop power control.

The technology described herein enables an improved estimation method of Signal-to-Interference Ratio.

Also, the technology described herein enables a correction of the quality requirement.

These and other advantages are achieved in accordance with the attached claims.

Briefly, the technology described herein provides a method of inner loop power control by determining a quality requirement based on the concept of mutual information and comparing the requirement to a quality estimate This is performed for at least one slot during every transmission time interval, whereby the transmit power can be adjusted for a coming slot based on at least one previously received slot.

According to a specific embodiment of a method according to the technology described herein, the transmit power in a TTI is adjusted to reach the Block Error Rate (BLER) target or BLER requirement instead of the SIR target. For a given channel codec, BLER is only determined directly by the total received block information (RBI) for a received coding block. Consequently, to reach the BLER target is to reach the RBI target for a certain codec.

According to another specific embodiment, a method for enabling an improved estimation of quality is presented.

Advantages of the technology disclosed herein comprise:
A more accurate quality requirement,
A quality target that can vary during a TTI, as well as from one TTI to another, thereby enables quicker adjustments and more accurate measurements,
A quality requirement that is more directly related to the decoding quality,
A more accurate quality estimation

BRIEF DESCRIPTION OF THE DRAWINGS

The invention, together with further objects and advantages thereof, may best be understood by making reference to the following description taken together with the accompanying drawings, in which.

ABBREVIATIONS

OLPC—Outer Loop Power Control

INPC—INner Loop Power Control

SIR—Signal to Interference Ratio

MI—Mutual Information

BEI—Block Error Indicator

CRC—Cyclic Redundancy Check

FI—Frame Information

RBI—Received Block Information

RSI—Received Slot Information

EESM—Exponential Effective SIR Mapping

BLER—BLock Error Rate

BLEP—BLock Error Probability rawBER—raw Bit Error Rate

TPC—Transmit Power Control

DETAILED DESCRIPTION

The technology disclosed herein is based on the recognition that the Link-to-system interface for a telecommunication system can be modeled more accurately directly based on the so-called mutual information (MI) expression. Also, the MI can be mapped directly to the Block Error Rate (BLER) to make the quality model simpler. Link-to-system (L2S) interface studies by the inventors show that the mapping from a multi-state channel to the decoding quality can be described very well by the mutual information (MI) concept. There are also some other approximate MI expressions, such as Exponential Effective SNR Mapping (EESM), cut-off rate and logarithmic ESM, etc that can be useful.

Figure 1:
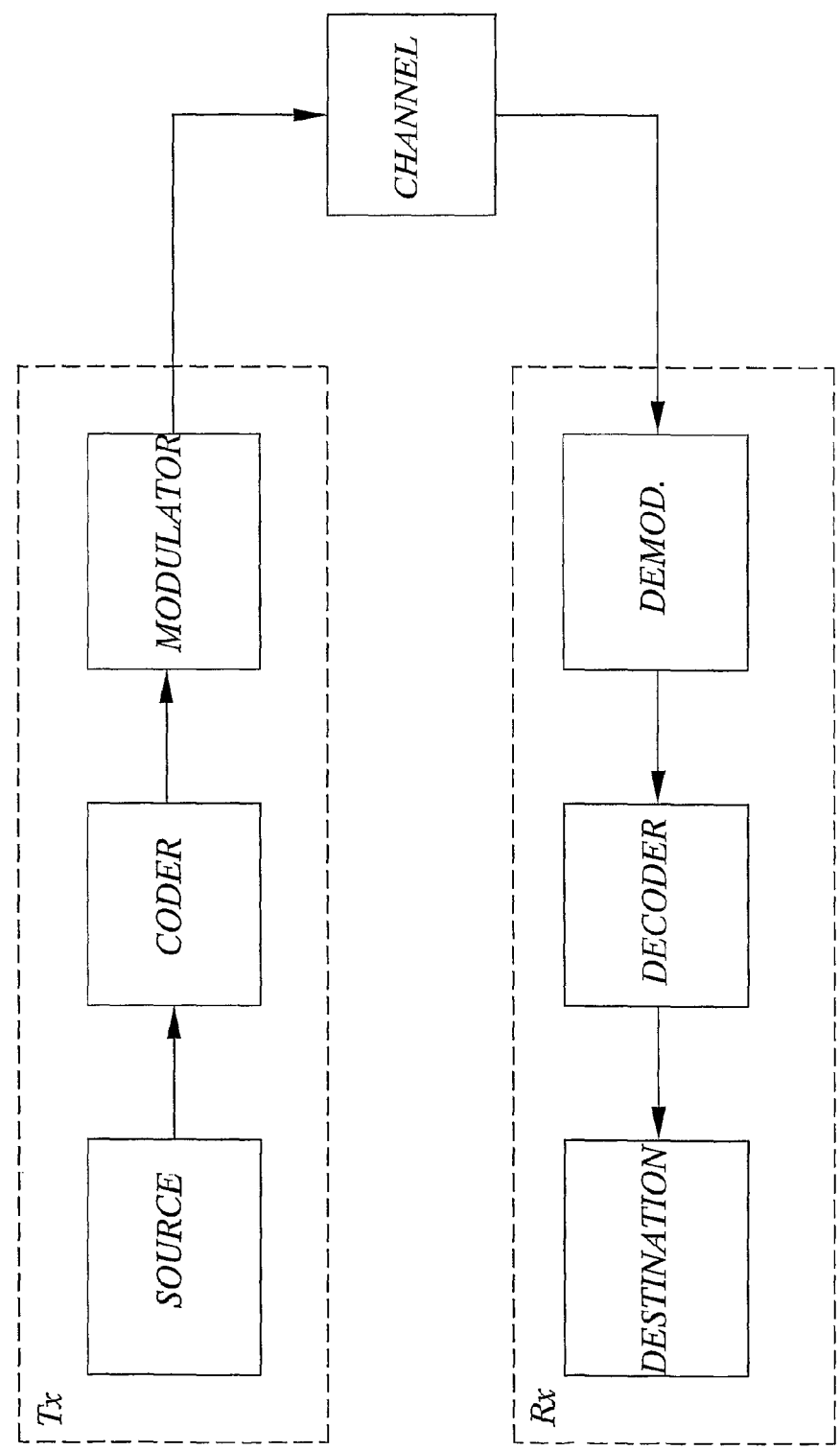
FIG. 1 is a schematic illustration of a transmitter-receiver system.

In order to enable a full understanding of the MI concept and its approximate expressions a detailed explanation will follow below. The description will be based on a schematic telecommunication system comprising a transmitter Tx comprising a source, a coder and a modulator, a channel, and a receiver Rx comprising a demodulator, a decoder and a destination, see FIG. 1.

Seen from the decoder the information from the source is carried by the soft outputs of the demodulator. The classical information value from information theory is the so called mutual information MI between channel input and output, i.e. between encoder-output bit and decoder-input soft bit. The channel coding theorem states that an ideal codec is capable of transmitting reliably at a coding rate equal to the mutual information of the channel. The information measure based on the channel capacity can, according to the inventors, be expressed as the modulated Symbol-level mutual Information (SI) value. With the symbol SIR of $\gamma_j$ $$\gamma_j = (E_s/N_0)_j \quad (1)$$

at time j, SI is denoted by $I(\gamma_j)$:

$$I(\gamma_j) = E_{XY}\left\{\log_2 \frac{P(Y|X,\gamma_j)}{\sum_X P(X)P(Y|X,\gamma_j)}\right\} \quad (2)$$

$$= E_X\left\{\int_{Y_R=-\infty}^{+\infty}\int_{Y_I=-\infty}^{+\infty} P(Y|X,\gamma_j) \cdot \log_2 \frac{P(Y|X,\gamma_j)}{\sum_X P(X)P(Y|X,\gamma_j)} dY_I dY_R\right\}$$

where the modulated symbol X belongs to a certain modulation constellation, and the received symbol $Y=(Y_R+i^*Y_I)\in C$, where C is the set of complex numbers. In Equation (2), P(X) is the a-priori probability of X, $P(Y|X,\gamma_j)$ is the probability density function of Y conditioned on transmit symbol X and parameterized by channel state $\gamma_j$.

The behavior of a certain codec can be expressed as the mutual information per coding block.

For a (N, K) coding block, where K denotes the number of information bits and N denotes the number of coded bits within one coding block, which corresponds to J modulated symbols, the channel capacity is the accumulation of the SI:s within the block.

Assuming the received coding block experiences a multiple channel state $\{\gamma_1, \gamma_2, \ldots, \gamma_j\}$ the mutual information is further defined in different levels:

Received coded block information (RBI):

$$RBI(\{\gamma_j, j=1 \sim J\}) = \sum_{j=1}^{J} I(\gamma_j) \quad (3)$$

For an M-order modulation, it has $I(\gamma_i) \leq \log_2 M = N/J$, therefore $RBI(\gamma_j) \leq N$.

Received coded bit information rate (RBIR):

$$RBIR(\{\gamma_j, 1 \propto J\}) = RBI(\{\gamma_j\})/N \quad (4)$$

Block Error rate (BLER), i.e. the ratio of the number of the error blocks over the total number of the transmitted blocks.

Frame information (FI), i.e. received decoded bit information within one coding block $$FI(\{\gamma_j, j=1 \propto J\}) = (1-BLER)^*K \quad (5)$$

Block success rate (BSR), i.e. normalized FI $$BSR(\{\gamma_j, 1 \propto J\}) = 1-BLER \quad (6)$$

Throughput (TP)

$$TP(\{\gamma_j, 1 \propto J\}) = BSR(\{\gamma_j\})^* R_{infobits} = FI(\{\gamma_j\})/T_{codingblock} \quad (7)$$

Where $R_{infobits}$ is the transmission rate of the information bits, and $T_{codingblock}$ is the period of one coding block.

Modulation Model by Mutual Information (MI)

The modulation model only deals with the symbol-level mutual information SI, as defined in Equations (1) and (2) for different modulation constellations.

According to Shannon information theory, the channel capacity for an AWGN channel without bandwidth limit is:

$$C=\log_2(1+E_S/N_0)[\text{bits/symbol}] \tag{8}$$

For digital modulation the mutual information SI stands for the capacity of a discrete-input and continuous-output channel. The capacity of an M-order constellation cannot be higher than $\log_2 M$, but it can be quite close to Shannon channel capacity at very low SIR values in case of a perfect knowledge of $\gamma_j$. In addition, given a channel state $\gamma_j$, SI is larger for a higher-order modulation in case of a perfect knowledge of the channel. However, it can be expected in case of imperfect channel estimation that the information content will be limited by the estimation of $\gamma_j$.

Figure 2:
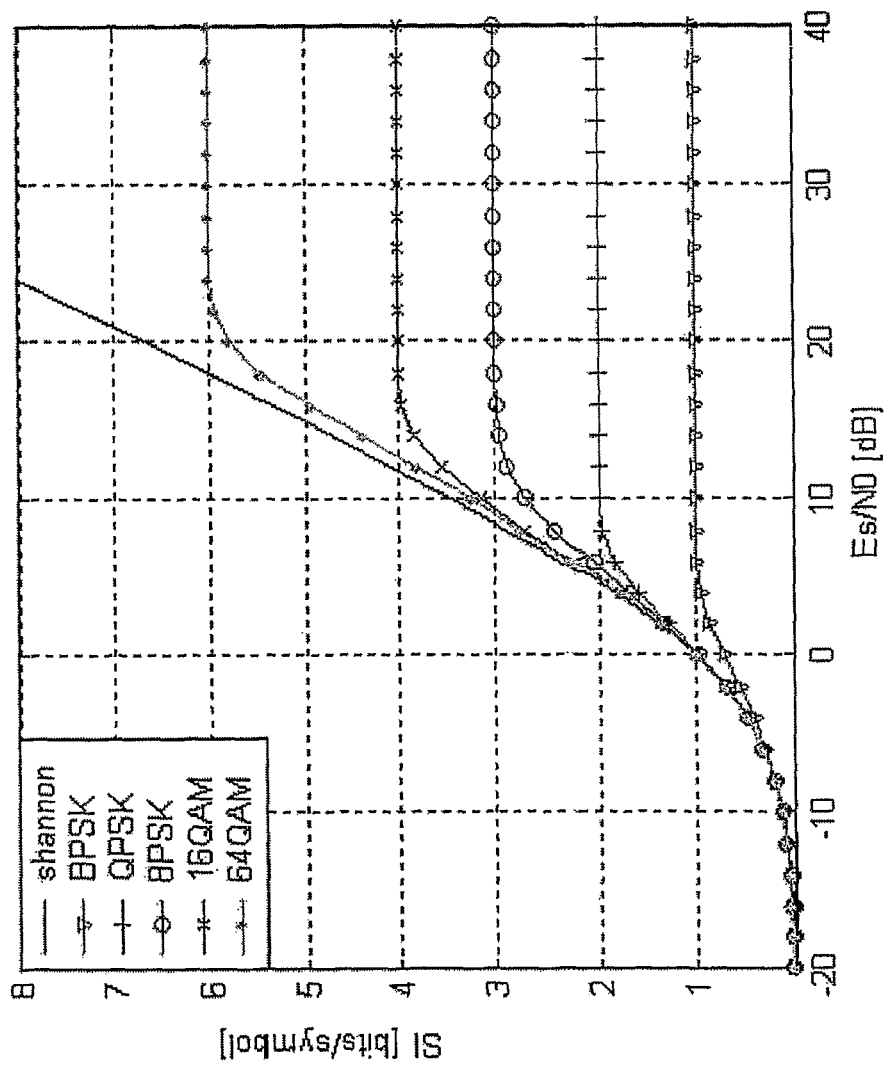
FIG. 2 is a graph illustrating the signal to interference ration for different modulations.
Figure 3:
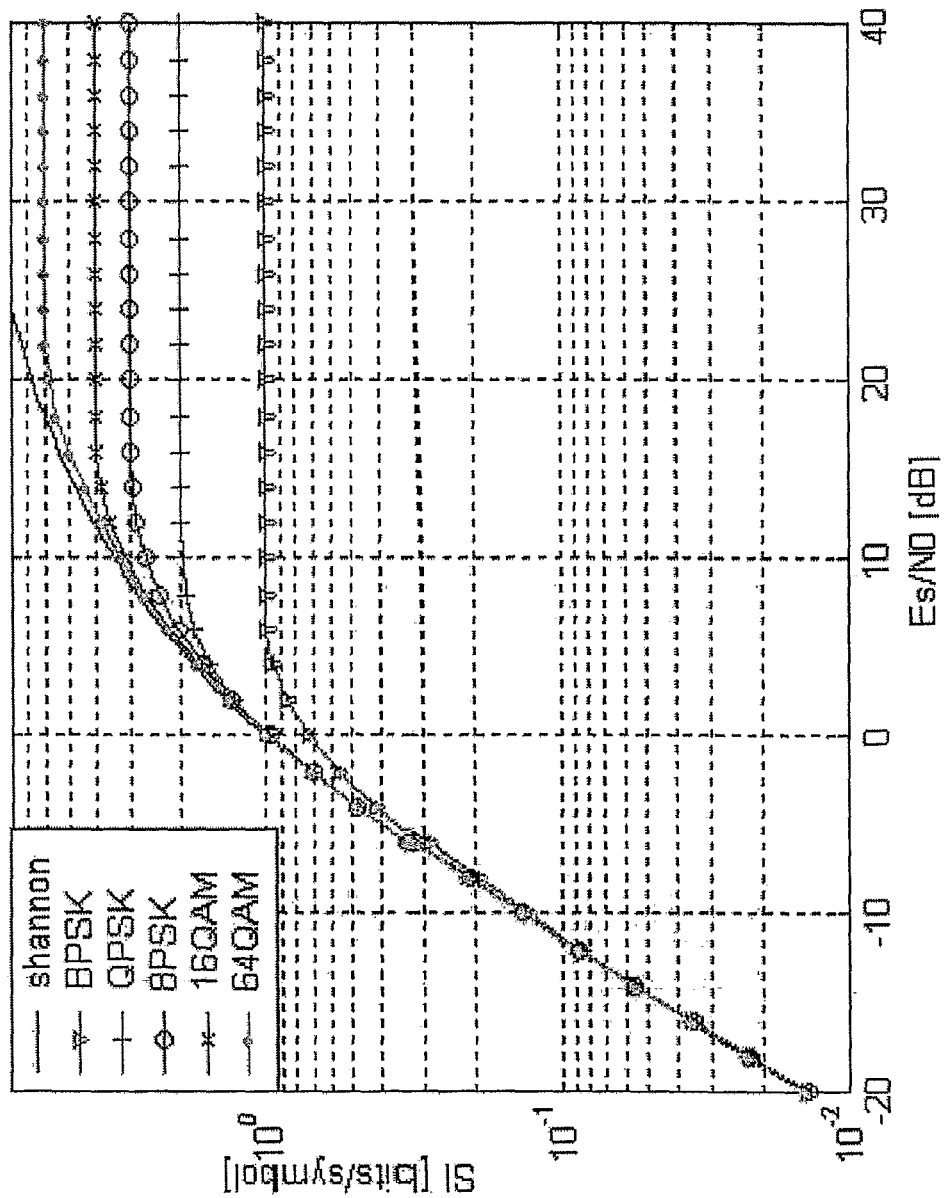
FIG. 3 is a graph illustrating the logarithm of FIG. 2.

FIG. 2 and FIG. 3 illustrate the mutual information SIs of different modulations, e.g. BPSK, QPSK, 8PSK, 16QAM and 64QAM, as well as the Shannon channel capacity. It can be seen that the capacity of an M-order constellation cannot be higher than $\log_{2M}$, but it can be quite close to Shannon channel capacity at very low SIR values in case of a perfect knowledge of $\gamma_i$. In addition, given a channel state $\gamma_i$, SI is larger for a higher-order modulation in case of a perfect knowledge of the channel. However, it can be expected in case of imperfect channel estimation that the information content will be limited by the estimation of $\gamma_j$.

Coding Model for Multi-State Channel

The coding quality model for a multi-state channel includes four steps as follows:

Step 1: For a set of soft outputs of the demodulator with the multiple channel states $\{\gamma_1, \gamma_2, \ldots, \gamma_J\}$, $\{SI_1, SI_2, \ldots, SI_J\}$ are calculated by checking the look-up table of mutual information for a certain constellation, as described by the Modulation Model described earlier.

Step 2: Select the look-up tables for a codec. It is generated based on AWGN simulation results, which should not be influenced by the modulation modes. Look-up tables of FI to RBI and BLER to RBIR are used.

Step 3: Collect RBI or RBIR by Equation (3) or (5). To simulate the codec behaviour in case of non-optimal decoding algorithm, a modification is needed in Equation (3) by introducing a correctness for RBI, named as RBI adjusting factor-$RBI_{cod}$, as follows:

$$RBI(\{\gamma_j, j = 1 \approx J\}) = RBI_{cod} \sum_{j=1}^{J} I(\gamma_j) \tag{9}$$

Another correctness method for RBI is expressed by:

$$RBI(\{\gamma_j, j = 1 \approx J\}) = \sum_{j=1}^{J} I(\gamma_j / \gamma_{cod}) \tag{10}$$

With the SIR-domain adjustment factor $\gamma_{cod}$.

Step 4: Get the quality indicators by checking the AWGN look-up tables.

Figure 4:
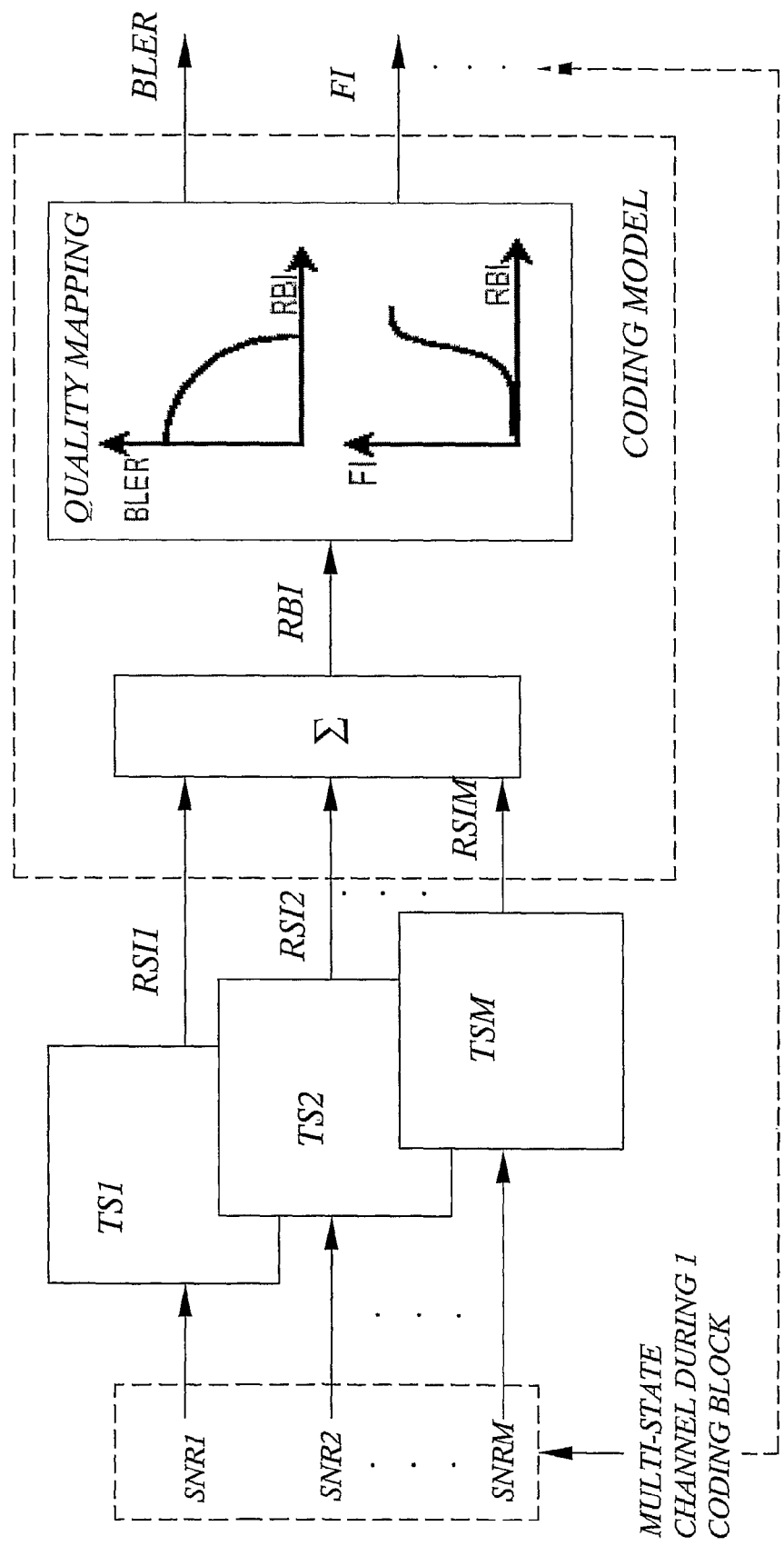
FIG. 4 is a schematic block diagram illustrating the underlying coding model for an example embodiment.

FIG. 4 gives a schematic illustration of the principles of the modulation and coding model based on mutual information as described above.

According to the above described MI quality mode, modulation/demodulation behaviour and coding/decoding behaviour are independent of each other; therefore they can be modelled individually. The modulation model is quite accurate and simple for different constellations, without any adjusting factor. However the coding correctness is still needed for those non-optimal decoding algorithms.

The technology disclosed herein will be described based on the above mutual information quality model.

Basically, the technology disclosed herein comprises a method for INPC, wherein an estimated quality is compared to a quality target or requirement that is determined based on at least the mutual information for a received signal. The quality requirement can be determined for at least one slot for each Transmission Time Interval (TTI), preferably for each slot. Finally, the power is adjusted based on the comparison.

According to the technology disclosed herein, based on the MI quality model, the quality requirement, which can be expressed as BLER target or the target of any other quality indicator, corresponds to a certain quantity of the collective received block information (RBI) before decoding, denoted as RBI target. The relation between SIR and RBI is decided by the modulation mode and the coding block size, and the relation between BLER and RBI is decided by the coding mode.

The general idea according to a specific embodiment of the technology disclosed herein is to monitor the difference between the RBI target and the RBI after each slot received, and calculate the averaged received slot information (RSI) requirement, denoted as RSI target, for the remaining slots. Such implementation is preferably done during the whole TTI.

The above method is equivalent to setting the TTI-level effective SIR equal to the SIR target. The technology disclosed herein describes the INPC target and the instantaneous measurement by mutual information because it relates to the decoding quality more directly than the traditional SIR expression.

The INPC can have a fixed step as in the current 3GPP, or variable steps with feeding back more information than increase/decrease indication.

However, this method relies on the accurate SIR estimation. To improve its robustness against SIR estimation errors, a correctness based on quality measurement is introduced.

A detailed description of a particular embodiment of a method according to the technology disclosed herein will be described below with reference to FIG. 5 and FIG. 6.

Figure 5:
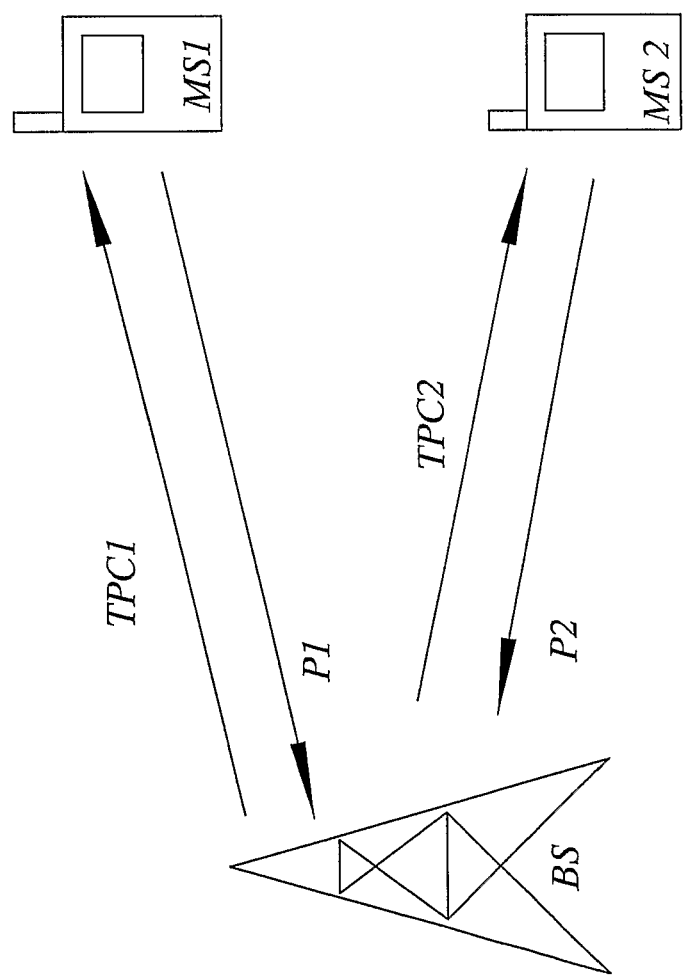
FIG. 5 is a schematic illustration of a communication system in which the technology disclosed herein can be utilized.

Referring to FIG. 5, consider a telecommunication system comprising at least one node, such as a base station BS communicating with a plurality of nodes, such as mobile stations MS1, MS2. During communication the mobile stations MS1, MS2 issue transmit power control commands TPC1, TPC2 to the base station BS, requesting the base station BS to either increase or decrease its transmission power P1, P2.

It is understood that the situation can be reversed, i.e. a mobile station can be communicating with a plurality of base stations and be requested to increase or decrease transmission power.

Referring to the above described system in FIG. 5 and the method of FIG. 6, an embodiment of a method according to the technology disclosed herein will be described in more detail.

Description of INPC

Assuming one coding block of a received signal consists of M slots, each of which contains K modulated symbols, the received coded block mutual information or RBI expresses the block-level channel capacity, and the received coded slot level mutual information or RSI expresses the slot-level channel capacity. For received L slots at the receiver, which experiences a multiple channel state $\{\gamma_1, \gamma_2, \ldots, \gamma_L\}$, the received RBI is expressed as:

$$RBI_L = \sum_{m=1}^{L} RSI_m, \quad L \leq M \tag{11}$$

For the m-th slot with the estimated channel state $E_s/N_0 = \gamma_m$, it has:

$$RSI_m = K \cdot I(\gamma_m) \tag{12}$$

where $I(\gamma_m)$ is the symbol-level mutual information. Besides the above given definition of $I(\gamma_m)$, there are other approximate expressions as below for a modulator with the modulation order denoted as 'Mod_order'.

$$I_{EESM}(\gamma_m) = \text{Mod\_order} \cdot (1 - e^{-\gamma_m}) \tag{13}$$

$$I_{R0}(\gamma_m) = \text{Mod\_order} \cdot (1 - \log_2(1 + e^{-\gamma_m/2})), \text{BPSK cutoff rate} \tag{14}$$

$$I_{Gauss}(\gamma_m) = \tfrac{1}{2} \log_2(1+\gamma_m), \text{AWGN capacity, real Gaussian input} \tag{15}$$

$$I_{log}(\gamma_m) = \log(\gamma_m) \tag{16}$$

$$I_{lin}(\gamma_m) = \gamma_m \tag{17}$$

For a certain codec, the relation between RBI and BLER or any other quality indicators can be provided in look-up tables. Therefore, a given quality requirement, $RBI_{target}$ can, in step S1 of FIG. 6, be obtained by checking out the Averaged White Gaussian Noise(AWGN) performance of the codec.

According to a specific embodiment of the technology disclosed herein the quality target or requirement is determined for each slot in a received coding block, it is however possible to utilize the technology disclosed herein for just one slot as well. The following description is based on (but not limited to) determining target and estimated quality for a plurality of slots in a received coding block.

Based on $RBI_{target}$, and the estimated $RBI_{L-1}$ of the (L−1) received slots, $RSI_{target}$ for determining an ASH output for a forthcoming slot, selecting transmit power in accordance with comparison RSI target and an RSI estimation, a coming slot is set as:

$$RSI_{target,L} = \frac{RBI_{target} - RBI_{L-1}}{M - L + 1}, \quad L = 1 \sim M \tag{18}$$

Figure 6:
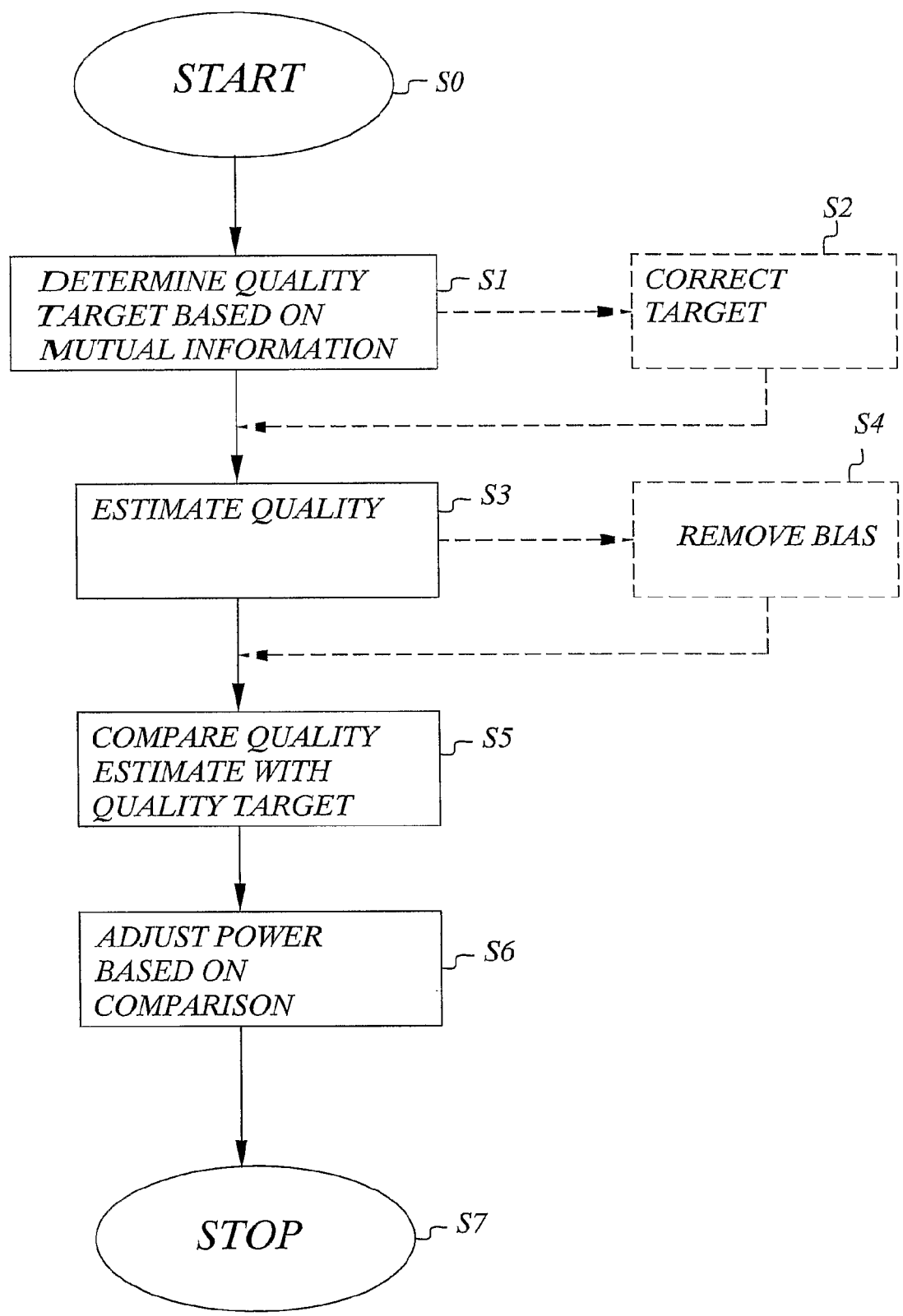
FIG. 6 is a schematic flow diagram of an example embodiment of a method according to the technology disclosed herein.

Next, in step S5, the determined quality requirement (of step S1 of FIG. 11) is compared to the estimated quality (of Step S-3 of FIG. 6).

Assuming L slots were received, the RSI was measured. Comparing with the RBI target there are still $$\Delta RBI = RBI_{target} = \sum_{m=1}^{L} RSI_m$$

information left for the coming M−L slots to transmit. Consequently, the RSI target can be determined by the channel estimations of the coming M−L slots. For instance, assuming constant channel in the following −L slots, the RSI target for the (L+1):th slot is $RSI_{target} = \Delta RBI/(M-L)$. Consequently, in step S6, the transmit power is set according to the comparison between $RSI_{target}$ and the RSI estimation. For instance of a two-level Transmit Power Control (TPC) command, it is set as:

$$tpccmd_{L+1} = \begin{cases} +1, & \text{when } RSI_{target,L} > RSI_L \\ -1, & \text{when } RSI_{target,L} < RSI_L \end{cases} \tag{19}$$

which is further derived as:

$$tpccmd_{L+1} = \begin{cases} +1, & \text{when } \dfrac{RSI_{target,L}}{K} > I(\gamma_L) \\ -1, & \text{when } \dfrac{RSI_{target,L}}{K} < I(\gamma_L) \end{cases} \tag{20}$$

The TPC command is preferably issued from a mobile station to a transmitting base station or from a base station to a transmitting mobile station. However, it is also possible for the receiving unit (base station or mobile station) to transmit actual measurements and leave the power control decision to the transmitting unit.

The RBI-based INPC is equivalent to setting the TTI-level effective SIR equal to the SIR target. The TTI-level effective SIR is defined as:

$$\gamma_{\text{eff}} = I^{-1}\left(\frac{1}{K}\sum_{k=1}^{K} I(\gamma_k)\right) \tag{21}$$

According to the technology disclosed herein, the SIR target for the (L+1) slot is determined by RSI target as:

$$SIR_{target} = SI2SIR(RSI_{target}/S) \tag{22}$$

In summary, in a TTI, the transmit power is adjusted to reach the BLER target instead of the SIR target. For a given channel codec, BLER is only determined directly by the total received block information (RBI) for a received coding block. The mapping relationship (i.e. the look-up table) between RBI and BLER can be obtained by simulation. Consequently, to reach the BLER target is to reach the RBI target for a certain codec.

In order to further improve the accuracy of the method according to the technology disclosed herein, it is possible and sometimes necessary to introduce a bias removing step or correction step in order to improve the accuracy of the SIR or RBI estimation.

Figure 7:
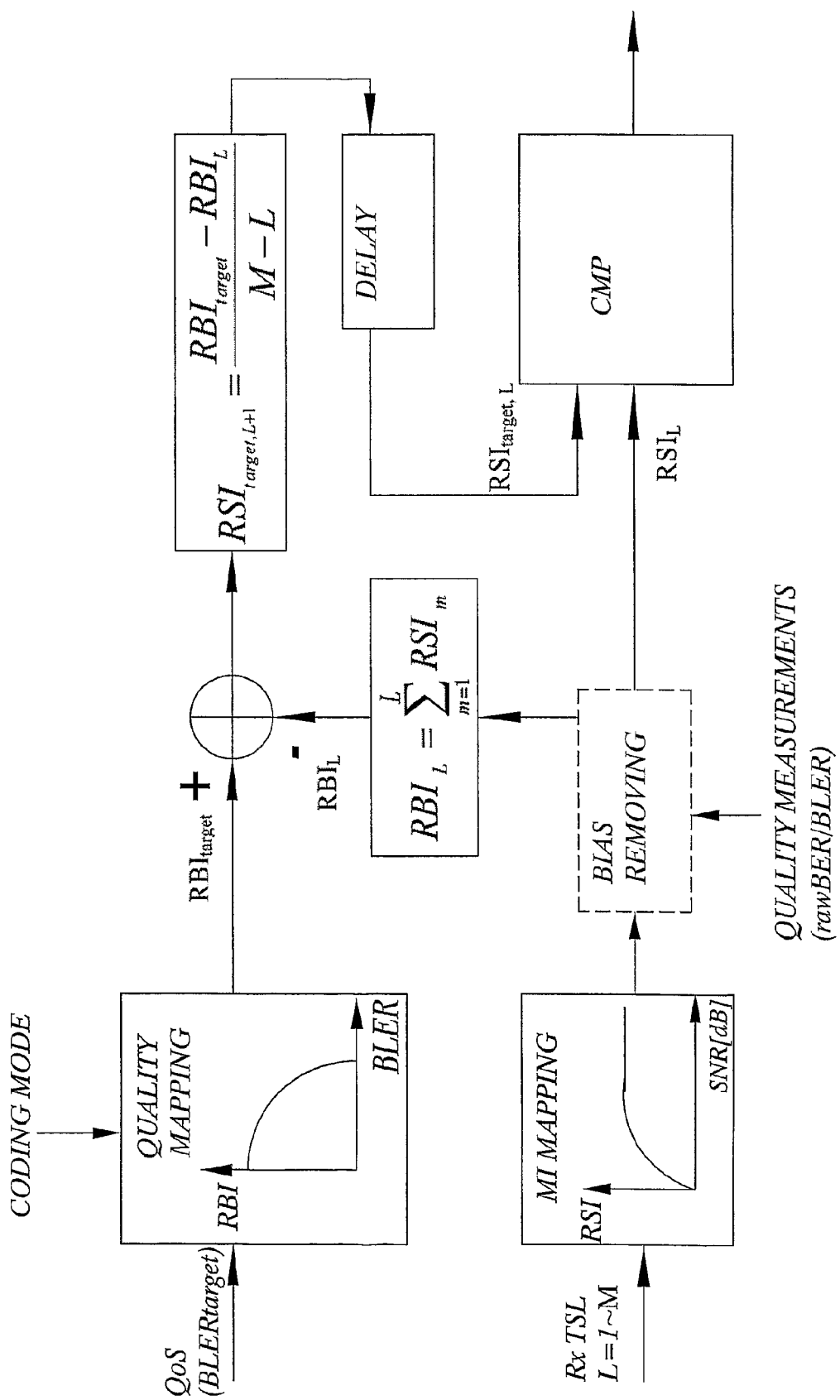
FIG. 7 is a schematic illustration of a specific embodiment of an example method according to the technology disclosed herein.

A specific embodiment according to the invention comprises the step S2 (see FIG. 6) of introducing an Open Loop Power Control (OLPC) to adjust the RBI target according to a comparison between the quality requirement or target and the quality measurements, e.g. BLER, instantaneous BLEP, FI or any other quality indicators, see FIG. 6 and FIG. 7

The OLPC adjusts the SIR target, denoted as $\gamma_{target}$ of the INPC based on the BLER measurement. Therefore, the new corrected $RBI_{target}$ can be calculated by:

$$RBI_{target} = M \cdot K \cdot I(\gamma_{target}) \tag{23}$$

Another specific embodiment of the technology disclosed herein comprises the step of introducing a bias-removing step S4 in the SIR estimation or RBI estimation. The bias estimation should ideally be quick enough to catch up with the channel variation and accurate enough to express the difference between the quality measurement and the quality requirement. The bias can be estimated based on the measurements of any quality indicators, such as rawBER, BER or the iteration times in Turbo decoding. An INPC with bias-removing can be viewed as a method of single loop power control.

The rawBER of each slot in a prior TTI, denoted as $\{rawBER_{m,TTI(n-1)}, m=1{\sim}M\}$, can be measured by comparing recoded decoded info-bits with the received demodulation decisions. The corresponding accurate SIER estimates can be obtained as:

$$\hat{\gamma}_{m,TTI(n-1)} = Q^{-1}(rawBER_{m,TTI(n-1)})^2, \ m=1{\sim}M \quad (24)$$

And the corresponding accurate RSI estimates are:

$$\hat{RSI}_{m,TTI(n-1)} = K \cdot I(\hat{\gamma}_{m,TTI(n-1)}) \quad (25)$$

A bias is calculated by comparing the set of accurate RSI estimates with the RSI estimates in the (n−1)th TTI in INPC.

$$bias_{TTI(n-1)} = \frac{1}{M}\sum_{m=1}^{M}\left(RSI_{m,TTI(n-1)} - \hat{RSI}_{m,TTI(n-1)}\right) \quad (26)$$

Consequently, the bias removing is implemented for all the slots in the n-th TTI:

$$RSI_{m,TTI(n)} = RSI_{m,TTI(n)} - bias_{TTI(n-1)} \ \pounds{-}m = 1{\sim}M \quad (27)$$

Comparing to the known solutions the technology disclosed herein has advantages according to at least two aspects.

Relating to fast-varying channel conditions:

i) In a TTI, the transmit power is adjusted to reach the BLER target instead of the SIR target. That the dB-level averaged SIR equals the SIR target is different from that the quality equals the BLER target in case of multi-state channels during one TTI. The advantage is more obvious when channel various significantly during one TTI either due to middle or high mobile speed, or due to the fast-varying interference during the TTI.

ii) The RSI target varies from slot to slot, according to the channel variation during one TTI, which is a self-correcting system.

iii) The INPC target and the instantaneous measurement as described by mutual information relates more directly to the decoding quality than the traditional SIR expression.

Regarding the stability of the strategy, i.e. its robustness against SIR estimation errors, the correctness based on quality measurements helps to keep the robustness against the SIR estimation errors.

i) The correctness based on OLPC is simple and has no contradiction to the current standard.

ii) The bias removing method is quick enough to catch up with the channel variation. Since there is no requirement of feedbacks of TTI-level target adjustment, there will be only one loop of power control, which has similar quality as combining INPC and OLPC.

It is equally permissible to apply the technology disclosed herein on the downlink and the uplink. That is, either a mobile station commands the base station to increase or decrease transmit power or the base station commands the mobile station to increase or decrease its transmit power.

The technology disclosed herein describes the possibility to determine a quality requirement for each of a plurality of slots of a coding block based on the mutual information of the received signal. It is however possible to determine the quality requirements based on some other measurements not described by this technology disclosed herein.

Figure 8:
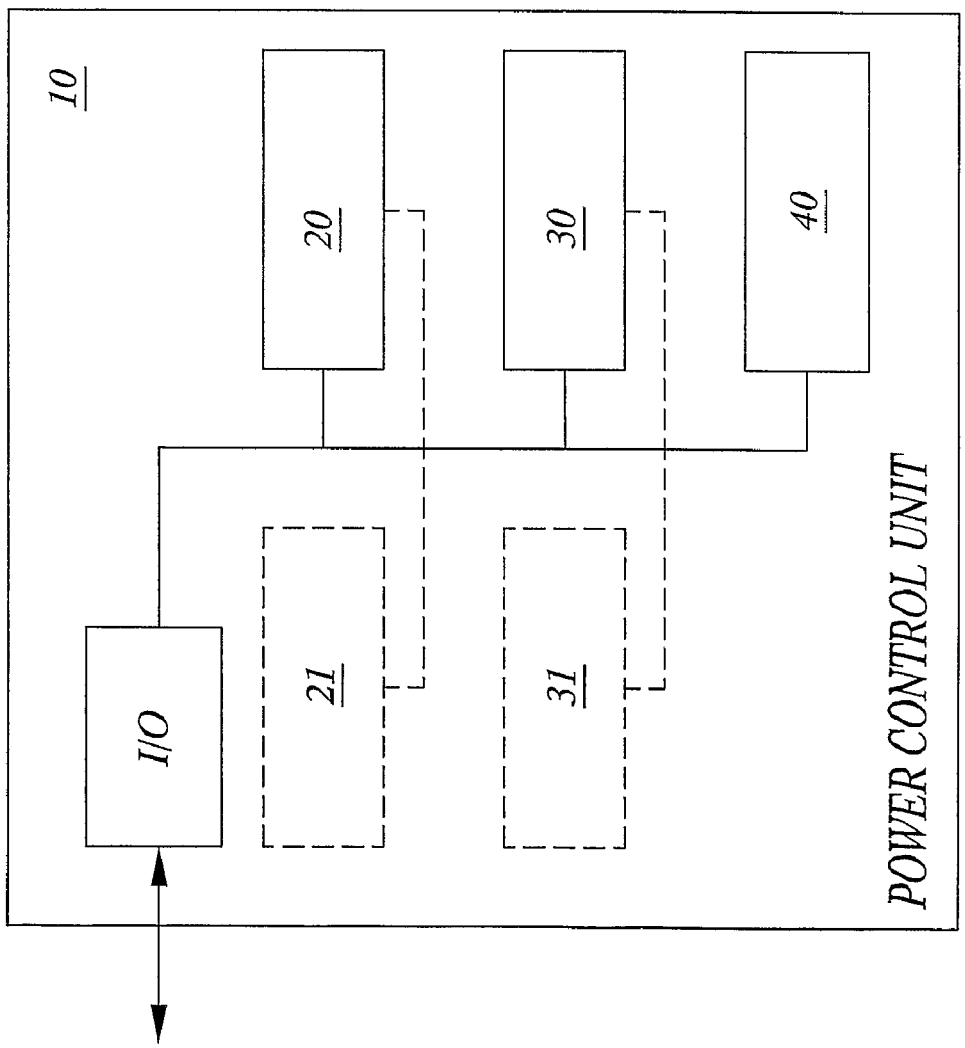
FIG. 8 is a schematic block diagram of an example arrangement according to the technology disclosed herein.

An embodiment of an arrangement for enabling improved inner loop power control in a telecommunication system will be described with reference to FIG. 8.

According to the invention technology disclosed herein, an arrangement 10 for inner loop power control comprises a unit 20 for determining a quality requirement, a unit 30 for comparing the determined quality target to an estimated quality, and a unit 40 for adjusting the level of transmission or transmit power based on the comparison.

Further, the arrangement 10 comprises an auxiliary unit 21 for adjusting the quality requirement and an auxiliary unit 31 for adjusting the estimated quality prior to the comparison. These two units can be present at the same time or singularly.

The quality target adjusting unit 21 is adapted to adjust the quality target based on momentary quality measurements.

The quality estimate adjusting unit 31 is adapted to adjust the quality target by removing bias from the estimated quality. Such bias removing can be performed based on momentary quality measurements such as rawBER.

It will be understood by those skilled in the art that various modifications and changes may be made to the present invention without departure from the scope thereof, which is defined by the appended claims.

REFERENCES

[1] Kazuhiro Arimitsu (NEC), "Patent: Base station transmission power control method and apparatus", International patent classification: H04B 7/00, Pub. No.: US 2002/0058524 A1, May 16, 2002.

[2] Pascal Agin, Nicolas Billy (Alcatel), "Patent: Method of adjusting the target value of an inner power control loop in a mobile radio communications system", International patent classification: H04B 7/00, Pub. No.: US 2002/0187802 A1, Dec. 12, 2002.

[3] Jonsson, Elias (Ericsson), "Patent: Power control in mobile radio communications system", International patent classification: H04B 7/005, Pub. No.: WO 03/055098 A1, Jul. 3, 2003.

[4] Shiau-He Shawn Tsai, Farideh Khaleghi, Patrik Nils Lundqvist (Ericsson), "Transmit power control based on virtual decoding", International patent classification: H04M 1/00, Pub. No.: US 2003/0224836 A1, Dec. 4, 2003.

The invention claimed is:

1. A method for improved inner-loop power control for at least one link in a communication system, said method comprising:
   comparing an estimated quality for a received signal with a quality requirement:
   adjusting, transmission power level for the link based on the comparison:
   determining the quality requirement based on at least a representation of mutual information for the received;
   wherein said representation is a quality indicator that can be directly calculated from the mutual information;
   wherein said quality indicator is calculated according to effective SIR=MI2SIR(mutual information), where MI is the mutual information and SIR is the signal to interference ratio.

2. A method for improved inner-loop power control for at least one link in a communication system, said method comprising:
   comparing an estimated quality, for a received signal with a quality requirement;

adjusting transmission power level for the link based on the comparison:

determining the quality requirement based on at least a representation of mutual information for the received signal;

determining the quality requirement for at least one slot of a coding block.

3. The method according to claim 2, further comprising determining the quality requirement for each slot of the coding block.

4. The method according to claim 2, wherein said representation corresponds to the mutual information of the received signal.

5. The method according to claim 2, wherein said representation is an approximation of the mutual information.

6. The method according to claim 2, wherein said representation is the normalized mutual information or an approximation thereof.

7. The method according to claim 2, wherein said quality requirement is represented by one of received block error rate, received bit error rate, received block information, received slot information.

8. The method according to claim 2, wherein said quality requirement is represented by a signal to interference ratio.

9. The method according to claim 2, further comprising adjusting the quality requirement based on momentary quality measurements, before comparing it to the estimated quality.

10. The method according to claim 2, further comprising adjusting the estimated quality before comparing it to the quality requirement.

11. The method according to claim 10, wherein said adjusting step comprises a step of removing bias from the estimated quality in order to enable a corrected estimated quality.

12. The method according to claim 11, wherein said bias removing step is based at least on momentary quality measurements such as rawBER.

13. A method for improved inner-loop power control for at least one link in a communication system, said method comprising:

comparing an estimated quality for a received signal with a quality requirement;

adjusting transmission power level for the link based on the comparison;

determining the quality requirement based on at least a representation of mutual information for the :received signal;

determining the quality requirement for at least one slot based on a channel prediction for coming slots, information measurements of previously received slots and the quality requirement for a coding block.

14. The method according to claim 13, further comprising:

determining the information measurement of the received slots based on a quality-dependent bias-removing algorithm for a slot-level quality indicator.

15. The method according to claim 14, further comprising determining the information measurement of the received slots based on a RawBER-assisted bias-removing RBI (Received block information) estimation or SIR (Signal to Interference Ratio) estimation algorithm.

16. A method for improved inner-loop power control for at least one link in a communication system, said method comprising:

comparing an estimated quality for a received signal with a quality requirement; adjusting transmission power level for the link based on the comparison:

determining the quality requirement based on at least a representation of mutual information for the received signal;

wherein said representation corresponds to the mutual information of the received signal and wherein said quality requirement for a received slot is determined based on the determined quality requirement for a predetermined number of previously received slots.

17. An arrangement for enabling improved inner-loop power control for at least one link in a telecommunication system, comprising:

means for determining a quality requirement for the at least one link based at least on a representation of mutual information for a received signal, and means for comparing the determined quality requirement to an estimated quality for the received signal, and means for adjusting transmission power level for the at least one link based on said comparison wherein said determining means are adapted to determine the quality requirement for at least one received slot for each received block.

18. The arrangement according to claim 17, wherein said determining means are adapted to determine the quality requirement for each received slot.

19. An arrangement for enabling improved inner-loop power control for at least one link in a telecommunication system, characterized by:

means for determining a quality requirement for the at least one link based at least on a representation of the mutual information for a received signal, and means for comparing the determined quality requirement to an estimated quality for the received signal, and means for adjusting the transmission power level for the at least one link based on said comparison;

wherein said determining means is adapted to determine the quality requirement for a received slot based on a predetermined number of preceding received slots.

20. The arrangement according to claim 19, wherein said determining means are adapted for determining the quality requirement based on a representation that corresponds to one of the mutual information, the normalized mutual information, approximate expressions for the mutual information, or approximate expressions for the normalized mutual information.

21. The arrangement according to claim 20, further comprising means for adjusting the quality requirement based on momentary quality measurements before comparing it to the estimated quality.

22. The arrangement according to claim 19, further comprising means for adjusting the estimated quality before comparing it to the quality requirement.

23. A method for inner-loop power control for at least one channel in a communication system between a transmitter and a receiver, the method comprising:

(1) monitoring, for each slot of a multi-slot coding block, a difference between a received block information target value $RBI_{target}$ and a received block information value RBI;

(2) using the difference of act (1) to determine an average received slot information requirement $RSI_{target}$ for remaining slots of the coding block; and (3) using the average received slot information requirement $RSI_{target}$ to determine a transmit power control command for adjusting transmission power level for the channel.

24. The method of claim 23, further comprising obtaining the received block information target value $RBI_{target}$ as a function of a codec of the transmitter.

25. The method of claim 23, further comprising obtaining the received block information target value $RBI_{target}$ based on Averaged White Gaussian Noise (AWGN) performance of a codec of the transmitter.

26. An arrangement for inner-loop power control for at least one channel in a communication system between a transmitter and a receiver, the arrangement comprising:
(1) means for monitoring, for each slot of a multi-slot coding block, a difference between a received block information target value $RBI_{target}$ and a received block information value RBI;
(2) means for using the difference of act (1) to determine an average received slot information requirement RSI target for remaining slots of the coding block; and
(3) means for using the average received slot information requirement $RSI_{target}$ to determine a transmit power control command for adjusting transmission power level for the channel.

27. The arrangement of claim 26, further comprising means for obtaining the received block information target value $RBI_{target}$ as a function of a codec of the transmitter.

28. The arrangement of claim 26, further comprising means for obtaining the received block information target value $RBI_{target}$ based on Averaged White Gaussian Noise (AWGN) performance of a codec of the transmitter.

\* \* \* \* \*

UNITED STATES PATENT AND TRADEMARK OFFICE
CERTIFICATE OF CORRECTION

| | |
|---|---|
| PATENT NO. | : 7,817,972 B2 |
| APPLICATION NO. | : 11/666173 |
| DATED | : October 19, 2010 |
| INVENTOR(S) | : Wan et al. |

It is certified that error appears in the above-identified patent and that said Letters Patent is hereby corrected as shown below:

On the Title Page, in item (52), under "U.S. Cl.", in Column 1, Line 1, after "455/115.1;", insert --324/76.11, 157--.

In Column 1, Line 29, delete "overshout" and insert -- overshoot --, therefor.

In Column 1, Line 63, after "received", insert -- TTIs --.

In Column 3, Line 59, delete "decoder" and insert -- decoder, --, therefor.

In Column 4, Line 43, delete "$I(\gamma_i)$" and insert -- $I(\gamma_j)$ --, therefor.

In Column 5, Line 19, delete "$\log_{2M}$," and insert -- $\log_2 M$, --, therefor.

In Column 5, Line 21, delete "$\gamma_i$." and insert -- $\gamma_j$. --, therefor.

In Column 5, Line 21, delete "$\gamma_i$," and insert -- $\gamma_j$, --, therefor.

In Column 7, Line 40, delete "$RBI_{target}$," and insert -- $RBI_{target}$ --, therefor.

In Column 7, Line 43, after "comparison", insert -- of --.

In Column 9, Line 8, delete "SIER" and insert -- SIR --, therefor.

In Column 10, Line 6, after "the" delete "invention".

In Column 10, Line 52, in Claim 1, delete "requirement:" and insert -- requirement; --, therefor.

In Column 10, Line 54, in Claim 1, delete "comparison:" and insert -- comparison; --, therefor.

In Column 10, Line 66, in Claim 2, delete "quality," and insert -- quality --, therefor.

In Column 11, Line 2, in Claim 2, delete "comparison:" and insert -- comparison; --, therefor.

Signed and Sealed this
Twenty-second Day of March, 2011

David J. Kappos
*Director of the United States Patent and Trademark Office*

CERTIFICATE OF CORRECTION (continued)
U.S. Pat. No. 7,817,972 B2

In Column 11, Line 49, in Claim 13, delete ":received" and insert -- received --, therefor.

In Column 11, Line 53, in Claim 13, delete "slots" and insert -- slots, --, therefor.

In Column 12, Line 3, in Claim 16, delete "comparison:" and insert -- comparison; --, therefor.

In Column 12, Line 21, in Claim 17, delete "comparison" and insert -- comparison, --, therefor.